United States Patent [19]

Kobayashi

[11] Patent Number: 4,799,102
[45] Date of Patent: Jan. 17, 1989

[54] DIGITAL COLOR DEMODULATOR

[75] Inventor: Reiichi Kobayashi, Osaka, Japan

[73] Assignee: NEC Home Electronics Ltd., Osaka, Japan

[21] Appl. No.: 89,392

[22] Filed: Aug. 26, 1987

[30] Foreign Application Priority Data

Aug. 26, 1986 [JP] Japan .................................. 61-199393
Oct. 7, 1986 [JP] Japan .................................. 61-153214

[51] Int. Cl.⁴ .............................................. H04N 9/64
[52] U.S. Cl. ..................................... 358/23; 358/25; 358/19
[58] Field of Search .................... 358/13, 19, 23, 25

[56] References Cited

U.S. PATENT DOCUMENTS

| | | | |
|---|---|---|---|
| 4,349,833 | 9/1982 | Clarke | 358/23 |
| 4,395,729 | 7/1983 | Lewis | 358/21 R |
| 4,625,232 | 11/1986 | Nillesen | 358/23 |
| 4,686,560 | 8/1987 | Balaban et al. | 358/19 |
| 4,689,664 | 8/1987 | Moring et al. | 358/13 |
| 4,694,326 | 9/1987 | Demmer | 358/23 |
| 4,709,257 | 11/1987 | Suzuki | 358/23 |

FOREIGN PATENT DOCUMENTS 62679 4/1982 Japan ...................................... 358/23

Primary Examiner—John W. Shepperd
Attorney, Agent, or Firm—Cushman, Darby & Cushman

[57] ABSTRACT

This invention provides a digital color demodulator having: a first phase locked loop circuit which generates an analog subcarrier signal phase locked to the color burst signal; a second phase locked loop circuit which generates an internal system clock signal phase locked to a horizontal period; a Y/C color separation circuit operating under the internal system clock signal; a pair of multiplying circuits, one of which multiplies a digital subcarrier signal, converted from the analog subcarrier signal, with the color signal, and the other of which multiplies the digital subcarrier signal, phase delayed by substantially 90°, with the color signal, thereby performing orthogonal demodulation of the signal.

The digital processing circuits of this invention are all driven by the internal system clock signal generated by the second phase locked loop circuit.

15 Claims, 3 Drawing Sheets

DIGITAL COLOR DEMODULATOR

BACKGROUND OF THE INVENTION

1. Field of the Invention

The present invention relates to digital signal processing in a television receiver, and particularly relates to the improvement of a color demodulation system.

2. Description of the Prior Art

In conventional color demodulation systems, the clock signal which is used for A/D conversion has a quadruple subcarrier frequency ($4F_{SC}$) phase locked to a color burst signal. Data of $4F_{SC}$ in frequency are phase-shifted to be related to each other as $(R-Y)$, $(B-Y)$, $-(R-Y)$ and $-(B-Y)$. Every other piece of the data is extracted to perform color demodulation.

In conventional color demodulation systems, color demodulation can be performed even if the system receives an analog composite signal which is sent out from a video tape recorder, for example, and in which a color burst signal and a horizontal synchronizing signal are not synchronized with each other. However, since the video signal is subjected to A/D conversion through the use of the clock signal of the quadruple subcarrier frequency $4F_{SC}$ in the system, the number of the samples of one line may not be 910. When signal processing is performed, such as scanning line interpolation and double writing into a memory to double a scanning line, the number of the samples of one line is not a fixed value locked to a horizontal period but fluctuates. This engenders problems such as manufacturing 1H delay lines. Also, system circuitry becomes complex.

SUMMARY OF THE INVENTION

This invention solves many problems inherent in prior art apparatus.

This invention provides a digital color demodulator having: a first phase locked loop circuit which generates an analog subcarrier signal phase locked to the color burst signal; a second phase locked loop circuit which generates an internal system clock signal phase locked to a horizontal period; a Y/C color separation circuit operating under the internal system clock signal; a pair of multiplying circuits, one of which multiplies a digital subcarrier signal, converted from the analog subcarrier signal, with the color signal, and the other of which multiplies the digital subcarrier signal, phase delayed by substantially 90°, with the color signal, thereby performing orthogonal demodulation of the signal.

The digital processing circuits of this invention are all driven by the internal system clock signal generated by the second phase locked loop circuit. For that reason, signals can be digitally processed in the circuits, since the number of samples per horizontal line remains a fixed value locked to the horizontal period, even if an analog composite video signal does not have a prescribed correlation between the subcarrier frequency and frequency of horizontal synchronizing signal.

DETAILED DESCRIPTION OF THE PREFERRED EMBODIMENT

Two preferred embodiments of the present invention are described below.

Figure 1:
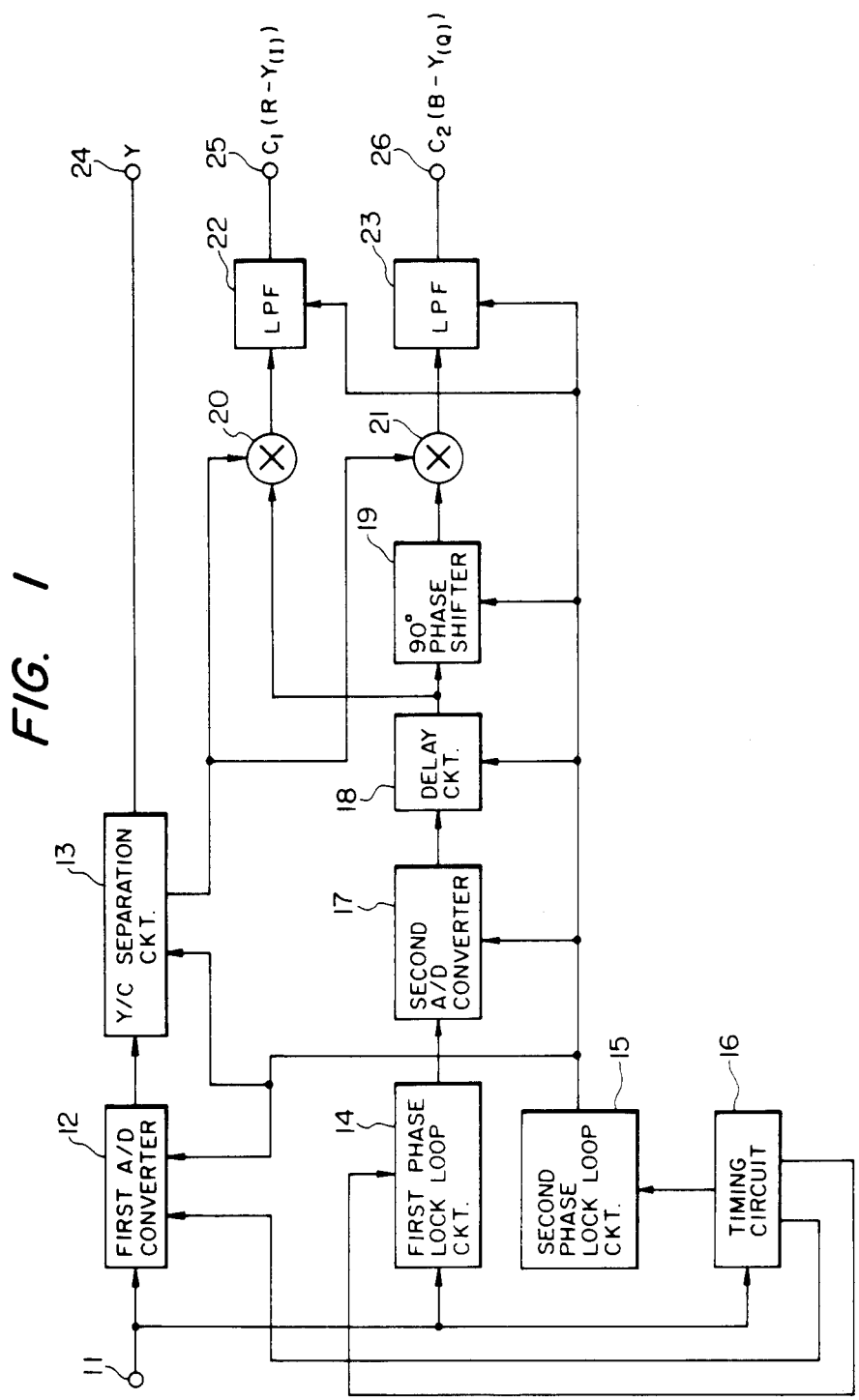
FIG. 1 shows a block diagram of a first embodiment of the present invention.

FIG. 1 shows a block diagram of a first embodiment of the invention. An input terminal 11 provides an analog composite video signal to a first A/D converter 12, a first phase locked loop circuit 14, and a timing circuit 16.

The first A/D converter 12 operates under an internal system clock signal of $910F_H$ ($F_H$ denotes a frequency of horizontal synchronizing frequency). Clamp pulses described below are supplied from the timing circuit 16 to the first A/D converter 12 so that the converter provides a digital composite video signal to a Y/C separation circuit 13.

The Y/C separation circuit 13 separates the digital composite video signal from the first A/D converter 12 into a luminance signal Y and a color signal C modulated by a color subcarrier signal. The luminance signal Y is output to an output terminal 24. The color signal C is output to a first and a second multiplier 20 and 21 described below.

The timing circuit 16 separates a horizontal and a vertical synchronizing signal from the analog composite video signal supplied through the input terminal 11. The timing circuit 16 generates: H pulses, synchronized with the horizontal synchronizing signal and having a horizontal period; clamp pulses, which are generated depending on the back porch of the horizontal synchronizing signal; and burst gate pulses, which are generated at the time for extracting a color burst signal included in the analog composite video signal.

FIG. 1 shows a second phase locked loop circuit 15 which generates the internal system clock signal of $910F_H$ in frequency, phase-locked to the H pulses sent out from the timing circuit 16.

The first phase locked loop circuit 14 operates under both the analog composite video signal supplied through the input terminal 11 and the burst gate pulses supplied from the timing circuit 16, and outputs an analog subcarrier signal.

A second A/D converter 17 converts the analog subcarrier signal from the first phase locked loop circuit 14 into a digital subcarrier signal, which is inputted into a delay circuit 18 next to the second A/D converter.

The delay circuit 18 delays the digital subcarrier signal by the equivalent of a delay in the Y/C separation circuit 13 and outputs the delayed digital subcarrier signal to a 90° phase shifter 19 and to the first multiplier 20 next to the delay circuit. The 90° phase shifter 19 is a one-sample delay (one-sample delay denotes a $1/910F_H$ delay).

The first and the second multipliers 20 and 21 are conventional digital multipliers and multiply the color signal C (modulated by a color subcarrier signal) by above-mentioned digital subcarrier signals. Both first and second multipliers 20 and 21 output a demodulated color signal including harmonic components. The output signals of the first and second multipliers 20 and 21 pass through a first and a second low pass filters 22 and 23, respectively, so that color difference signals $C_1$ and $C_2$ are outputted to output terminals 25 and 26, respectively. The first and second low pass filters 22 and 23 are conventional digital filters which remove harmonic components included in the output signals of the first and the second multipliers 20 and 21, respectively. The signals $C_1$ and $C_2$ correspond to $R-Y(I)$ and $B-Y(Q)$ signals, respectively.

The digital color demodulator will now be described in detail. The analog composite video signal is applied to the input terminal 11 with an exemplary property of 75Ω and 1 Vp—p. The first A/D converter 12 converts an analog composite video signal into the 8-bit digital composite video signal. The first A/D converter 12 includes a low pass filter and a pedestal clamp circuit, which operates under the clamp pulses supplied from the timing circuit 16. The first A/D converter 12 performs sampling by internal system clock signal generated by the second phase locked loop circuit 15 and having a frequency of $910F_H$.

Figure 2:
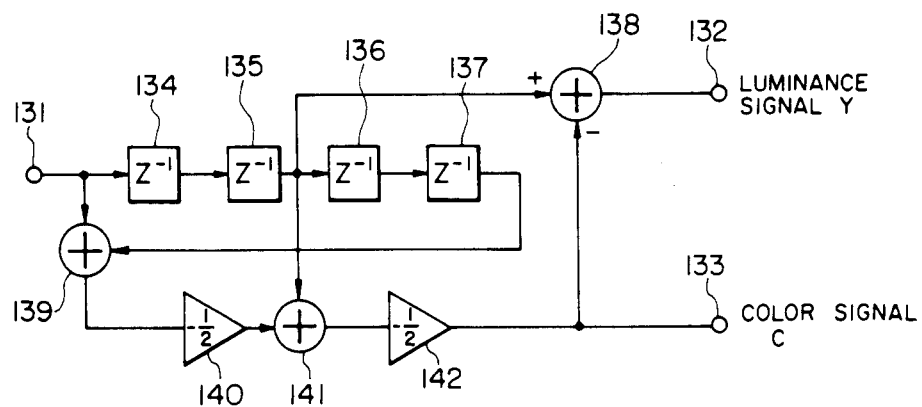
FIG. 2 shows a block diagram of a Y/C separation circuit in the first embodiment.

The Y/C separation circuit 13, which is supplied with the digital composite video signal from the first A/D converter 12, is made of a digital filter, for example, shown in FIG. 2. The Y/C separation circuit 13 separates the luminance signal Y and the color signal C modulated by the color subcarrier signal, and outputs the luminance signal and the color signal. FIG. 2 shows a terminal 131 to which the digital composite video signal is supplied from the first A/D converter 12, a terminal 132 from which the luminance signal Y is generated, and a terminal 133 from which the color signal C modulated by the color subcarrier signal is generated. FIG. 2 also shows delay lines $Z^{-1}$ for $(1/910F_H)$, and a positive and a negative half weighting circuits 142 and 140. The delay lines $Z^{-1}$ and the weighting circuits 140 and 142 are conventional ones.

The first phase locked loop circuit 14 operates with both the analog composite video signal supplied from the input terminal 11 and the burst gate pulses supplied from the timing circuit 16, so that the first phase locked loop circuit outputs the analog subcarrier signal phase-locked to the color burst signal.

The second A/D converter 17 is supplied with the analog subcarrier signal from the first phase locked loop circuit 14 and outputs the 8-bit digital subcarrier signal. The second A/D converter 17 includes a low pass filter for removing harmonics included in the analog subcarrier signal, an amplifier for amplifying the signal to the dynamic range of the second A/D converter, and a bias circuit for biasing the signal to the center of the dynamic range of the A/D converter. The second A/D converter 17 samples the analog subcarrier signal by using the internal system clock signal outputted by the second phase locked loop circuit 15 and having the frequency of $910F_H$.

The delay circuit 18 delays the digital subcarrier signal to compensate for the delay caused by the signal processing in the Y/C separation circuit 13. The digital subcarrier signal generated by the delay circuit 18 and the color signal C generated by the Y/C separation circuit 13 are multiplied together by the first multiplier 20.

The digital subcarrier signal generated by the delay circuit 18 is also supplied to the 90° phase shifter 19 which serves as a one-sample delay to delay the digital subcarrier signal by substantially 90° and then supply the signal to the second multiplier 21.

The color signal C separated by the Y/C separation circuit 13 is supplied to the second multiplier 21 as well as the first multiplier 20. Each of the first and the second multipliers 20 and 21 is an 8-bit/8-bit multiplier in the exemplary embodiment. The first and the second multipliers perform orthogonal demodulation with the once delayed digital subcarrier signal from the delay circuit 18, the twice delayed digital subcarrier signal from the 90° phase shifter 19, and the color signal C.

The low pass filters 22 and 23, which are conventional digital filters, are connected to the output sides of the first and the second multipliers 20 and 21, respectively, so that the harmonic components included in the output signals of the multipliers and centering about a frequency of $2F_{sc}$ are removed from the output signals to thereby obtain the color difference signals $C_1$ and $C_2$. Thus, the color difference signals $C_1$ and $C_2$ are outputted to the output terminals 25 and 26.

The outputs from the first and second multipliers 20 and 21 can be changed from the color difference signals $R-Y$ and $B-Y$ into signals I and Q by altering the demodulation axes. Such operation obviously, does not depart from the character and spirit of the present invention.

The second phase locked loop circuit 15 outputs the internal system clock signal having the frequency of $910F_H$ and phase-locked to the H pulses generated by the timing circuit 16. The internal system clock signal are supplied as drive pulses to the circuits of the digital color demodulator except to the first and the second multipliers 20 and 21 and the first phase locked loop circuit 14.

Figure 3:
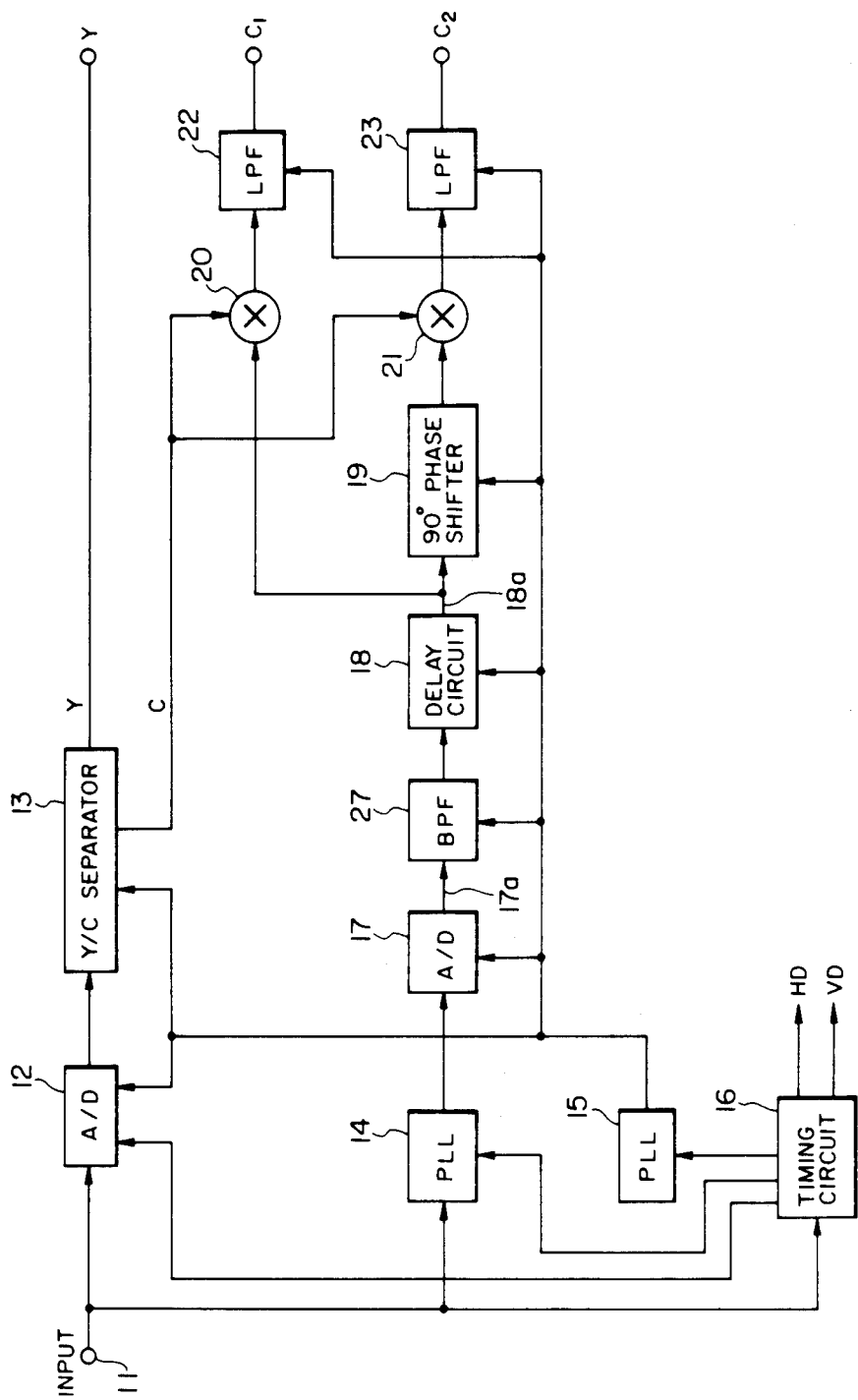
FIG. 3 shows a block diagram of a second embodiment of the present invention.

FIG. 3 shows a block diagram of a second embodiment of the present invention. In FIG. 3, like parts and components are designated by the same reference numerals as that in FIG. 1.

According to the second embodiment in FIG. 3, the band pass filter 27 of linear phase and symmetric gain characteristic is connected as a digital filter to extract the subcarrier. The set DC bias level of the A/D converter 17 is likely to fluctuate due to the temperature characteristic thereof and a DC component comes into the output 17a from the A/D converter due to the nonlinearity thereof. Besides, a high-frequency noise inevitably comes into the output 17a. The band pass filter is so provided as to prevent the high-frequency noise from coming into the output 17a.

Figure 4A:
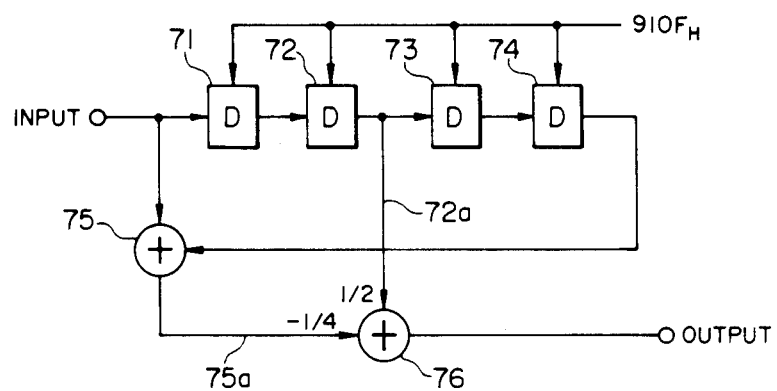
FIGS. 4A & 4B show the constitution and characteristic of a band pass filter in the second embodiment.

FIG. 4(a) shows the constitution of the band pass filter 27 which is a transversal filter comprising four delay elements 71, 72 73 and 74 in series and adders 75 and 76. The clock signal of $910F_H$ in frequency is used in filter 27.

The adder 76 is a coefficient adder in which a signal 75a is multiplied by $-\frac{1}{4}$, a signal 72a is multiplied by $+\frac{1}{2}$ and the signals added together. An impulse response is $(-0.25, 0, 0.5, 0, -0.25)$.

Figure 4B:
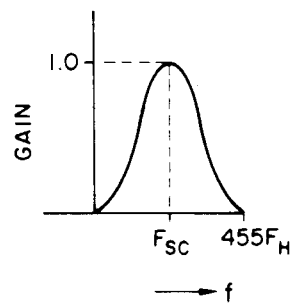

As shown in FIG. 4(b), the band pass filter 27 has the symmetric gain characteristic having a peak at substantially the subcarrier frequency $F_{sc}$ and acts to remove the DC component and the high-frequency noise.

The delay circuit 18 connected to the band pass filter 27 functions so that the phase of the C signal separated by the Y/C separation circuit 13 and that of an input signal 18a to the orthogonal demodulation section 120 are matched with each other.

According to the present invention, a digital color demodulation system operates with a clock signal having a frequency of $910F_H$ phase-locked to H pulses even if the analog composite video signal does not have a prescribed correlation between the subcarrier frequency and frequency of the horizontal synchronizing signal. For that reason, the number of the samples of one line is 910, so that a correlation perpendicular to picture data can be taken. Since a color difference signal is demodulated by multiplying an A/D-converted digital subcarrier signal and a color signal modulated by the subcarrier signal together in the system, color demodulation can be performed even if a sampling clock is not phase-locked to a color burst signal.

Further, a DC component generated in an analog section and an unexpected noise component are removed from the system owing to the band pass filter.

The reliability of the digital color demodulator is thus enhanced.

What is claimed is:

1. A demodulator for a color composite video signal comprising:
    means, receiving an analog composite video signal, for generating an internal system clock, phase-locked to a horizontal period of said analog composite video signal;
    means, receiving said analog composite video signal, and synchronized to said internal system clock, for generating a digital luminance signal and a digital color signal modulated by a color subcarrier signal from the analog composite video signal;
    means, receiving the analog composite video signal, synchronized to said internal system clock, for generating a digital subcarrier signal directly from the analog composite video signal; and
    means, synchronized to said internal system clock, for orthogonally demodulating color difference signals based on said digital subcarrier signal and said digital color signal 2. A demodulator of claim 1, wherein said digital luminance and color signals generation means includes a first analog-digital convertor and a Y/C separation circuit.

3. A demodulator of claim 1, wherein said internal system clock generation means comprises:
    timing circuit generating, from the video signal, H pulses in synchronization with horizontal synchronizing signals of the video signal, clamp pulses depending on the back porch of the horizontal synchronizing signal, and burst gate pulses from the color burst signal included in the video signal; and
    second phase locked loop circuit generating, from the H pulses, said internal system clock signal in synchronization with the horizontal synchronizing signals.

4. A demodulator for an analog color composite video signal comprising:
    means, receiving said analog color composite video signal, for generating a digital luminance signal and a digital color signal modulated by a color subcarrier signal from the analog composite video signal;
    means for generating an internal system clock, phase locked to a horizontal period of the said analog composite video signal, which comprises:
    (a) a timing circuit generating, from the video signal, H pulses in synchronization with horizontal synchronizing signals of the video signal, clamp pulses depending on the back porch of the horizontal synchronizing signal, and burst gate pulses from the color burst signal included in the video signal; and
    (b) a first phase locked loop circuit generating, from the H pulses, said internal system clock signal in synchronization with the horizontal synchronizing signals;
    means for generating a digital subcarrier signal from the analog composite video signal, wherein said digital subcarrier signal generation means comprises:
    (a) a second phase locked loop circuit generating, from the video signal and the burst gate pulses, an analog subcarrier signal in synchronism with the color burst signal;
    (b) an analog-digital converter for converting the analog subcarrier signal into a digital subcarrier signal; and
    (c) a first delay circuit for delaying the digital subcarrier signal by an amount equal to the amount by which the separation means delay the luminance and color signals relative to the digital composite video signal; and
    means for orthogonally demodulating color difference signals based on said digital subcarrier signal and said digital color signal,
    wherein the digital luminance and color signals generation means, the digital subcarrier signal generation means and the orthogonal demodulation means operate under said internal system clock.

5. A demodulator of claim 4, wherein said orthogonal demodulation means comprises:
    second delay circuit delaying the phase of the once delayed digital subcarrier signal by substantially 90°;
    first means for multiplying said color signal by the once delayed digital subcarrier signal; and
    second means for multiplying said digital color signal by the twice delayed digital subcarrier signal.

6. A demodulator of claim 5, wherein the first multiply means comprises first filtering means for low-pass filtering the first multiplied signal to produce a first color difference signal, and the second multiply means comprises second filtering means for low-pass filtering the second multiplied signal to produce a second color difference signal.

7. A demodulator as in claim 4, further comprising:
    a band pass filter having a linear phase and a gain characteristic symmetric with regard to substantially the subcarrier frequency, the band pass filter being electrically positioned between said second analog digital converter and said first delay circuit.

8. A demodulator for a color composite video signal comprising:
    timing means for generating, from the analog composite video signal, H pulses in synchronization with horizontal synchronizing signals of the video signal, clamp pulses depending on the back porch of the horizontal synchronizing signal, and burst gate pulses from the color burst signal included in the video signal;
    means for generating, from the analog composite video signal and the burst gate pulses, an analog color subcarrier signal in synchronizing with the color burst signal;
    means for generating, from the H pulses, an internal system clock signal in synchronization with the horizontal synchronizing signals;
    first means for converting the analog color composite video signal into a digital composite video signal, the first conversion means being driven by the clamp pulses and sampled according to the internal system clock signal;

second means for converting the analog subcarrier signal into a digital subcarrier signal, the second conversion means being driven by the internal system clock signal;

means for separating the digital composite video signal into a luminance signal and a color signal modulated by a color subcarrier signal, the separation means receiving the composite video signal from the first conversion means;

first means for delaying the digital subcarrier signal by an amount equal to the amount by which the separation means delayed the luminance and color signals relative to the digital composite video signal, the first delay means being driven by the internal system clock signal;

second means for delaying the phase of the once delayed digital subcarrier signal by substantially 90°, the second delay means being driven by the internal system clock signal;

first means for multiplying the color signal by the once delayed digital subcarrier signal; and second means for multiplying the color signal by the twice delayed digital subcarrier signal.

9. A demodulator as in claim 8, further comprising:
first filtering means for low-pass filtering the output of the first multiply means to produce a first color difference signal; and
second filtering means for low-pass filtering the output of the second multiply means to produce a second color difference signal.

10. A demodulator as in claim 8, further comprising:
a band pass filter having a linear phase and a gain characteristic symmetric with regard to substantially the subcarrier frequency, the band pass filter being electrically positioned between the second conversion means and the first delay means.

11. A demodulator as in claim 1 or 8, wherein the internal system clock is of $910F_H$ in frequency.

12. A method for demodulating a color video signal comprising:
generating from the video signal: H pulses in synchronization with horizontal synchronizing signals of the video signal, clamp pulses depending on the back porch of the horizontal synchronizing signal, and burst gate pulses from the color burst signal included in the video signal;

generating, from the video signal and the burst gate pulses, an analog color subcarrier signal in synchronizing with the color burst signal;

generating, from the H pulses, an internal system clock signal in synchronization with the horizontal synchronizing signals;

converting the analog color composite video signal into a digital composite video signal, the conversion being driven by the internal system clock signal, and the clamp pulses;

converting the analog subcarrier signal into a digital subcarrier signal, the conversion being driven by the internal system clock signal;

separating the digital composite video signal into a luminance signal and a color signal modulated by a color subcarrier signal;

delaying the digital subcarrier signal by an amount equal to the amount by which separating the luminance and color signals delayed those signals relative to the original digital composite video signal, the delaying being performed in response to the internal system clock signal;

delaying the phase of the delayed digital subcarrier signal by substantially 90°, the delaying being performed in response to the internal system clock signal;

multiplying the color signal by the once-delayed digital subcarrier signal to produce a first demodulated signal; and multiplying the color signal by the twice-delayed digital subcarrier signal to produce a second color difference signal to produce a second demodulated signal.

13. A method as in claim 12, further comprising:
low-pass filtering the first demodulated signal to produce a first color difference signal; and
low-pass filtering the second demodulated signal to produce a second color difference signal.

14. A method as in claim 12, further comprising band pass filtering the digital subcarrier signal prior to delaying the signal, the band pass filter transfer function having a linear phase and a gain characteristic symmetric with regard to substantially the subcarrier frequency.

15. A method as in claim 12, wherein the internal system clock signal is of $910F_H$ in frequency.

* * * * *